United States Patent
Panguloori et al.

(10) Patent No.: US 9,504,130 B2
(45) Date of Patent: Nov. 22, 2016

(54) SETTINGS FOR LIGHT LOADS CONNECTED TO BUS

(71) Applicant: KONINKLIJKE PHILIPS N.V., Eindhoven (NL)

(72) Inventors: Rakeshbabu Panguloori, Bangalore (IN); Priya Ranjan Mishra, Bangalore (IN)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/761,397

(22) PCT Filed: Jan. 2, 2014

(86) PCT No.: PCT/IB2014/058021
§ 371 (c)(1),
(2) Date: Jul. 16, 2015

(87) PCT Pub. No.: WO2014/111823
PCT Pub. Date: Jul. 24, 2014

(65) Prior Publication Data
US 2015/0359074 A1    Dec. 10, 2015

Related U.S. Application Data

(60) Provisional application No. 61/753,463, filed on Jan. 17, 2013.

(51) Int. Cl.
*H05B 37/02* (2006.01)
*H05B 33/08* (2006.01)

(52) U.S. Cl.
CPC ...... *H05B 37/0227* (2013.01); *H05B 33/0851* (2013.01); *H05B 37/0254* (2013.01); *H05B 37/0272* (2013.01); *Y02B 20/40* (2013.01)

(58) Field of Classification Search
CPC .......... H05B 37/0227; H05B 37/0254; H05B 37/0272; H05B 33/0851; Y02B 20/40
USPC ................. 315/297, 299, 307, 246
See application file for complete search history.

(56) References Cited

U.S. PATENT DOCUMENTS 8,184,456 B1    5/2012  Jain et al.
8,593,076 B2 *  11/2013 Veskovic ............. H05B 41/295
                                        315/200 R (Continued)

FOREIGN PATENT DOCUMENTS

CN    102130493 A    7/2011
WO    2012007055 A1  1/2012

(Continued)

*Primary Examiner* — Daniel D Chang
(74) *Attorney, Agent, or Firm* — Meenakshy Chakravorty

(57) ABSTRACT

Devices (1) for selecting settings for illuminating light loads (2, 3) connected to a bus (4) comprise controllers (11) for running processes and for defining, through controls of power converters (5, 6) connected to the bus (4), in response to process results, direct current voltage signals for the bus (4) and comprise power detectors (12) for detecting changes in total power consumptions of the illuminating light loads (2, 3) and for in response to detections of the changes informing the controllers (11) to run the processes again. This way, links are created between the total power consumption via the bus (4) and the direct current voltage signal on the bus (4), to save energy. The devices (1) may further comprise receivers (13) for receiving definitions of optimal individual voltage signals and/or of optimal individual power consumptions and/or of voltage amplitudes and may further comprise power meters (14) for measuring the total power consumption of the illuminating light loads (2, 3) for different direct current voltage signals for the bus (4).

13 Claims, 4 Drawing Sheets

(56) References Cited

U.S. PATENT DOCUMENTS

| | | |
|---|---|---|
| 2009/0224696 A1 | 9/2009 | Venkatraman et al. |
| 2010/0133904 A1 | 6/2010 | Klodowski et al. |
| 2010/0164450 A1 | 7/2010 | Dishman et al. |
| 2011/0309759 A1* | 12/2011 | Shteynberg ........ H05B 33/0815 315/201 |
| 2012/0043899 A1* | 2/2012 | Veskovic ............. H05B 41/295 315/200 R |
| 2012/0064900 A1* | 3/2012 | Thadasina ............. H04W 48/20 455/446 |
| 2012/0112654 A1 | 5/2012 | Choong |

FOREIGN PATENT DOCUMENTS

| | | |
|---|---|---|
| WO | 2012137092 A1 | 10/2012 |
| WO | 2012143814 A1 | 10/2012 |

* cited by examiner

SETTINGS FOR LIGHT LOADS CONNECTED TO BUS

CROSS-REFERENCE TO PRIOR APPLICATIONS

This application is the U.S. National Phase application under 35 U.S.C. §371 of International Application No. PCT/IB2014/058021, filed on Jan. 2, 2014, which claims the benefit of U.S. Provisional Patent Application No. 61/753, 463, filed on Jan. 17, 2013. These applications are hereby incorporated by reference herein.

FIELD OF THE INVENTION

The invention relates to a device for selecting a setting for one or more illuminating light loads connected to a bus. The invention further relates to a system, to a light load, to a method, to a computer program product and to a medium.

Examples of such a system are power converters and lamps.

BACKGROUND OF THE INVENTION

US 2010/0133904 A1 discloses a direct current bus voltage control for a two stage solar converter. This direct current bus is located between a boost converter for converting a direct current to a direct current and an inverter for converting a direct current to an alternating current.

US 2010/0133904 A1 is not related to selecting a setting for one or more illuminating light loads connected to a bus.

SUMMARY OF THE INVENTION

It is an object of the invention to provide an improved device. Further objects of the invention are to provide an improved system and to provide an improved method, a computer program product and a medium.

According to a first aspect, a device is provided for selecting a setting for one or more illuminating light loads connected to a bus, the device comprising a controller for running a process and for defining, through a control of a power converter connected to the bus, in response to a process result, a direct current voltage signal for the bus, and a power detector for detecting a change in a total power consumption of the one or more illuminating light loads and for in response to a detection of the change informing the controller to run the process again.

The controller controls the power converter and runs the process. In response to the process result, the controller defines the direct current voltage signal for the bus, through the control of the power converter connected to the bus. The power detector detects a minimum change or a larger change in the total power consumption of the one or more illuminating light loads. In response to the detection of the minimum change or the larger change, the power detector requests or advices or instructs the controller to run the process again. As a result, the one or more illuminating light loads receive a processed direct current voltage signal via the bus. When for example a number of illuminating light loads is increased or decreased, or when for example the environmental temperature increases or decreases, or when for example a number of other loads connected to the bus is increased or decreased, or when for example one or more of the light loads or one or more of the other loads change their behavior for whatever reason, the process is run again. This way, a link has been created between the total power consumption via the bus and the direct current voltage signal on the bus, and this link is a great advantage, for example when needing to save energy.

Preferably, there will be two or more light loads connected to the bus. Each light load may comprise one or more light emitting diodes of whatever kind and in whatever combination or may comprise a combination of a driver and one or more light emitting diodes or may comprise any other kind of lamp.

An embodiment of the device is defined by the power converter comprising an alternating current to direct current converter or comprising a direct current to direct current converter. An input of the alternating current to direct current converter is for example connected to an output of the mains. An input of the direct current to direct current converter is for example connected to an output of a solar panel. A combination of both converters in parallel is not to be excluded. Such parallel converters may perform simultaneously or subsequently in time.

An embodiment of the device is defined by further comprising a receiver for receiving, from the one or more illuminating light loads connected to the bus, a definition of an optimal individual voltage signal per illuminating light load and/or a definition of an optimal individual power consumption per illuminating light load, wherein the process comprises a calculation based on the definition per illuminating light load and a storage, for different direct current voltage signals for the bus, of the total power consumption or of an overall efficiency of the one or more illuminating light loads per direct current voltage signal for the bus, wherein the process comprises a selection of one of the different direct current voltage signals for the bus, for which one direct current voltage signal for the bus the total power consumption of the one or more illuminating light loads is minimal or the overall efficiency of the one or more illuminating light loads is maximal, and wherein the setting comprises the one direct current voltage signal for the bus.

According to this embodiment, each illuminating light load sends a definition of its optimal individual voltage signal and/or a definition of its optimal individual power consumption to the device. Alternatively, one illuminating light load collects the definitions from some other illuminating light loads and forwards all available definitions to the device. As a result, via the receiver of the device, all definitions of an optimal individual voltage signal of the illuminating light loads and/or all definitions of an optimal individual power consumption of the illuminating light loads are received and available. The process calculates, based on the definitions, for different direct current voltage signals for the bus, the total power consumption or the overall efficiency of the one or more illuminating light loads per direct current voltage signal for the bus, and stores calculation results. The process selects one of the different direct current voltage signals for the bus, for which one direct current voltage signal for the bus the total power consumption of the one or more illuminating light loads is minimal or the overall efficiency is maximal. In that case, the setting comprises this one direct current voltage signal for the bus, that results in minimal power consumption or maximal overall efficiency. Other definitions, such as optimal individual current signals etc. are not to be excluded.

An embodiment of the device is defined by the receiver being a wireless receiver for receiving the definitions from the light loads via a wireless connection. The wireless connection may be any kind of wireless connection.

An embodiment of the device is defined by the receiver being a wired receiver for receiving the definitions from the light loads via the bus or another wired connection. The wired connection may be any kind of wired connection.

An embodiment of the device is defined by further comprising a power meter for measuring the total power consumption of the one or more illuminating light loads for different direct current voltage signals for the bus, wherein the process comprises a storage, for the different direct current voltage signals for the bus, of the total power consumption of the one or more illuminating light loads per direct current voltage signal for the bus, wherein the process comprises a selection of one of the different direct current voltage signals for the bus, for which one direct current voltage signal for the bus the total power consumption of the one or more illuminating light loads is minimal, and wherein the setting comprises the one direct current voltage signal for the bus.

According to this embodiment, the total power consumption of the one or more illuminating light loads is measured for different direct current voltage signals for the bus. Thereto, the bus is operated at different direct current voltage levels, for example by starting with a minimum (maximum) direct current voltage level and increasing (decreasing) it stepwise or otherwise until a maximum (minimum) direct current voltage level has been reached, or in any other way. These direct current voltage levels are realized through the control of the power converter. As a result, via the power meter of the device, the total power consumption of the one or more illuminating light loads is measured and available for different direct current voltage signals for the bus. The process selects one of the different direct current voltage signals for the bus, for which one direct current voltage signal for the bus the total power consumption of the one or more illuminating light loads is minimal. In that case, the setting comprises this one direct current voltage signal for the bus, that results in minimal power consumption.

An embodiment of the device is defined by the process comprising a measurement and a storage, for different direct current voltage signals for the bus, of the total power consumption of the one or more illuminating light loads per direct current voltage signal for the bus, wherein the process comprises a selection of one of the different direct current voltage signals for the bus, for which one direct current voltage signal for the bus the total power consumption of the one or more illuminating light loads is minimal, and wherein the setting comprises the one direct current voltage signal for the bus.

According to this embodiment, the process measures the total power consumption of the one or more illuminating light loads for different direct current voltage signals for the bus. Thereto, the bus is operated at different direct current voltage levels, for example by starting with a minimum (maximum) direct current voltage level and increasing (decreasing) it stepwise or otherwise until a maximum (minimum) direct current voltage level has been reached, or in any other way. As a result, the total power consumption of the one or more illuminating light loads is measured and available for different direct current voltage signals for the bus. The process selects one of the different direct current voltage signals for the bus, for which one direct current voltage signal for the bus the total power consumption of the one or more illuminating light loads is minimal. In that case, the setting comprises this one direct current voltage signal for the bus, that results in minimal power consumption.

An embodiment of the device is defined by further comprising a receiver for receiving, from the one or more illuminating light loads connected to the bus, a definition of a voltage amplitude per illuminating light load, wherein the process comprises a determination of a maximum voltage amplitude of all voltage amplitudes received, wherein the process comprises a selection of a value of the direct current voltage signal for the bus, which value of the direct current voltage signal for the bus is equal to or slightly larger than the maximum voltage amplitude, and wherein the setting comprises the value of the direct current voltage signal for the bus.

According to this embodiment, each illuminating light load sends a definition of its (required) voltage amplitude to the device. Alternatively, one illuminating light load collects the definitions of the voltage amplitudes from some other illuminating light loads and forwards all available definitions of the voltage amplitudes to the device. As a result, via the receiver of the device, all definitions of the voltage amplitudes of all illuminating light loads are received and available. The process determines a maximum voltage amplitude of all voltage amplitudes received. The process selects a value of the direct current voltage signal for the bus, which value of the direct current voltage signal for the bus is equal to or slightly larger than the maximum voltage amplitude. Here, slightly larger means larger by a smallest (step) value. In that case, the setting comprises this value of the direct current voltage signal for the bus, to save energy. Other definitions, such as voltage characteristics, current amplitudes/characteristics and power amounts/characteristics etc. are not to be excluded.

An embodiment of the device is defined by the process comprising a retrieval, per illuminating light load connected to the bus, of a definition of a voltage amplitude of that illuminating light load, wherein the process comprises a determination of a maximum voltage amplitude of all voltage amplitudes retrieved, wherein the process comprises a selection of a value of the direct current voltage signal for the bus, which value of the direct current voltage signal for the bus is equal to or slightly larger than the maximum voltage amplitude, and wherein the setting comprises the value of the direct current voltage signal for the bus.

According to this embodiment, the process retrieves from each illuminating light load a definition of its voltage amplitude. Alternatively, the process retrieves via one illuminating light load the definitions of the voltage amplitudes from some other illuminating light loads, or retrieves the definitions of the voltage amplitudes from a storage location. As a result, all definitions of the voltage amplitudes of all illuminating light loads are available. The process determines a maximum voltage amplitude of all these voltage amplitudes. The process selects a value of the direct current voltage signal for the bus, which value of the direct current voltage signal for the bus is equal to or slightly larger than the maximum voltage amplitude. Here, slightly larger means larger by a smallest (step) value. In that case, the setting comprises this value of the direct current voltage signal for the bus, to save energy. Other definitions, such as voltage characteristics, current amplitudes/characteristics and power amounts/characteristics etc. are not to be excluded.

According to a second aspect, a system is provided comprising the device as defined above and further comprising the power converter.

According to a third aspect, a system is provided comprising the device as defined above and further comprising a light load.

According to a fourth aspect, a light load is provided, which light load is connectable to a bus and comprises a transmitter for transmitting a definition of an optimal individual voltage signal and/or a definition of an optimal individual power consumption to the device as defined above.

According to a fifth aspect, a method is provided for selecting a setting for one or more illuminating light loads connected to a bus, the method comprising running a process and defining, through a control of a power converter connected to the bus, in response to a process result, a direct current voltage signal for the bus, and detecting a change in a total power consumption of the one or more illuminating light loads and in response to a detection of the change running the process again.

According to a sixth aspect, a computer program product is provided for, when run on a computer, performing the steps of the method as defined above.

According to a seventh aspect, a medium is provided for storing and comprising the computer program product as defined above.

An insight is that a total power consumption via a bus and a direct current voltage signal on the bus are related. A basic idea is that, to select a setting for one or more illuminating light loads connected to a bus, a process is to be run, whereby, in response to a process result, a direct current voltage signal for the bus is to be defined, and whereby the process is to be run again in case the total power consumption is changed.

A problem to provide an improved device has been solved. A further great advantage is that energy is saved.

These and other aspects of the invention will be apparent from and elucidated with reference to the embodiments described hereinafter.

DETAILED DESCRIPTION OF EMBODIMENTS

Figure 1:
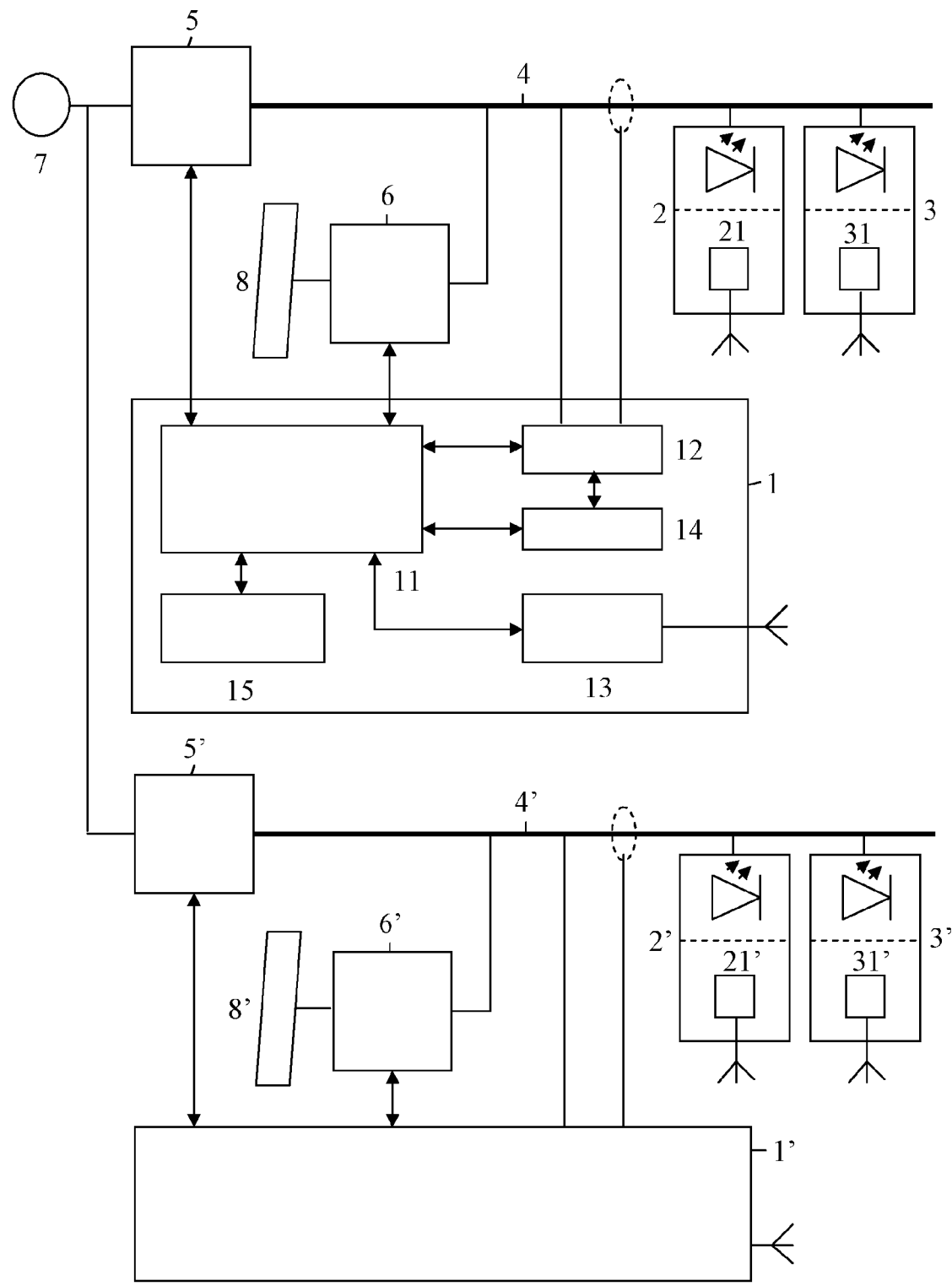
FIG. 1 shows an embodiment of a device.

In the FIG. 1, in general, a scalable and modular power distribution architecture is shown such as preferred for offices, commercial centers and data centers etc. The modular power distribution offers a high reliability, a low replacement time and an efficient power distribution. Light loads in offices, commercial centers and data centers etc. sometimes constitute 40 to 50% of the total energy consumption. To save energy, localized intelligent lighting is gaining popularity. Thereto, each light load may be equipped with occupancy/presence sensors and communication equipment to control an on/off state and/or an illumination level. Depending on for example an occupancy status and a daylight level, a lighting load power distribution profile changes dynamically. The optimum direct current voltage signal for the light loads may vary from light load to light load. To improve a lighting installation efficiency, a bus voltage is to be chosen more optimally.

In the FIG. 1, more in particular, an embodiment of a device 1 for selecting a setting for illuminating light loads 2, 3 is shown. An input of a power converter 5 here in the form of an alternating current to direct current converter is coupled to a mains supply 7, and an output of the power converter 5 is coupled to a bus 4. An input of a power converter 6 here in the form of a direct current to direct current converter is coupled to a solar panel 8, and an output of the power converter 6 is coupled to the bus 4. The bus 4 is coupled to a first light load 2 and to a second light load 3, here for example each comprising one or more light emitting diodes.

The device 1 for selecting the setting for the illuminating light loads 2, 3 comprises a controller 11 comprising a first control in/output coupled to a control in/output of the power converter 5 and comprising a second control in/output coupled to a control in/output of the power converter 6. The controller 11 runs a process and defines, through a control of the power converter 5, 6, in response to a process result, a direct current voltage signal for the bus 4. The device 1 further comprises a power detector 12 coupled to the controller 11 and to the bus 4 for detecting a change in a total power consumption of the one or more illuminating light loads 2, 3 and for in response to a detection of the change informing the controller 11 to run the process again. The power detector 12 is coupled to the bus 4 for getting information about the direct current voltage signal present on the bus 4 and about a current signal flowing through the bus 4 to calculate/estimate a total power consumption consumed via the bus 4. Alternatively, the power detector 12 may detect the total power consumption more directly, or the power detector 12 may detect or calculate/estimate the total power consumption via information received from the controller 11 and/or from the power converter 5, 6. Said calculation/estimation may possibly be performed in cooperation with a power meter 14 to be discussed later. Alternatively, the power detector 12 may form part of the controller 11.

The device 1 may further comprise a receiver 13 coupled to the controller 11 for receiving, from the one or more illuminating light loads 2, 3 connected to the bus 4, a definition of an optimal individual voltage signal per illuminating light load 2, 3 and/or a definition of an optimal individual power consumption per illuminating light load 2, 3. In that case, the process comprises a calculation based on the definition per illuminating light load 2, 3 and a storage into the storage unit 15, for different direct current voltage signals for the bus 4, of (values of) the total power consumption (or of (values of) an overall efficiency) of the one or more illuminating light loads 2, 3 per direct current voltage signal for the bus 4. Then, the process further comprises a selection of one of the different direct current voltage signals for the bus 4, for which one direct current voltage signal for the bus 4 the total power consumption of the one or more illuminating light loads 2, 3 is minimal (or for which one direct current voltage signal for the bus 4 the overall efficiency of the one or more illuminating light loads 2, 3 is maximal). The setting here comprises the one direct current voltage signal for the bus 4. This will be further explained at the hand of the flow chart shown in the FIG. 3.

The receiver 13 may be a wireless receiver for receiving the definitions from the light loads via a wireless connection and antennas as shown here, or may be a wired receiver for receiving the definitions from the light loads via the bus 4 (for example via the controller 11 and the power detector 12 or via a connection to the bus 4 not shown here) or via another wired connection (not shown here). Here, power line communication is not to be excluded. To be able to communicate with the receiver 13, each light load 2, 3 should comprise a transmitter 21, 31 for transmitting a definition of an optimal individual voltage signal and/or a definition of an optimal individual power consumption to the device 1. Such a transmitter 21, 31 may be a wireless transmitter or a wired transmitter etc.

The device 1 may further comprise a power meter 14 coupled to the power detector 12 and to the controller 11 for measuring the total power consumption of the one or more illuminating light loads 2, 3 for different direct current voltage signals for the bus 4. In that case, the process comprises a storage into the storage unit 15, for the different direct current voltage signals for the bus 4, of (values of) the total power consumption of the one or more illuminating light loads 2, 3 per direct current voltage signal for the bus 4. Then, the process further comprises a selection of one of the different direct current voltage signals for the bus 4, for which one direct current voltage signal for the bus 4 the total power consumption of the one or more illuminating light loads 2, 3 is minimal. The setting here comprises the one direct current voltage signal for the bus 4. This will be further explained at the hand of the flow chart shown in the FIG. 4.

Alternatively, the power meter 14 may measure the total power consumption more directly, or the power meter 14 may measure the total power consumption via information received from the controller 11 and/or from the power converter 5, 6. The power meter 14 may alternatively form part of the controller 11, and/or the power detector 12 and the power meter 14 may be combined into a single unit.

Alternatively to the power meter 14, the process may comprise a measurement and a storage, for different direct current voltage signals for the bus 4, of the total power consumption of the one or more illuminating light loads 2, 3 per direct current voltage signal for the bus 4. In that case, the process further comprises a selection of one of the different direct current voltage signals for the bus 4, for which one direct current voltage signal for the bus 4 the total power consumption of the one or more illuminating light loads 2, 3 is minimal. The setting here again comprises the one direct current voltage signal for the bus 4.

The receiver 13 may receive, alternatively or in addition, from the one or more illuminating light loads 2, 3 connected to the bus 4, a definition of a voltage amplitude per illuminating light load 2, 3. In that case, the process comprises a determination of a maximum voltage amplitude of all voltage amplitudes received, and a selection of a value of the direct current voltage signal for the bus 4, which value of the direct current voltage signal for the bus 4 is equal to or slightly larger than the maximum voltage amplitude. The setting here comprises the value of the direct current voltage signal for the bus 4. This will be further explained at the hand of the flow chart shown in the FIG. 5.

Alternatively to the receiver 13, the process may comprise a retrieval, per illuminating light load 2, 3 connected to the bus 4, of a definition of a voltage amplitude of that illuminating light load 2, 3. Then, the process further comprises a determination of a maximum voltage amplitude of all voltage amplitudes retrieved, and a selection of a value of the direct current voltage signal for the bus 4, which value of the direct current voltage signal for the bus 4 is equal to or slightly larger than the maximum voltage amplitude. The setting here again comprises the value of the direct current voltage signal for the bus 4.

Figure 2:
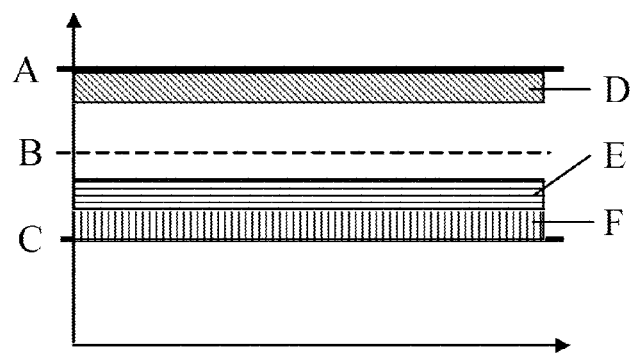
FIG. 2 shows a direct current voltage signal on a bus.

In the FIG. 2, a direct current voltage signal on a bus 4 is shown. The direct current voltage signal has a maximum value A, a nominal value B and a minimum value C. For example, as further explained at the hand of the flow chart shown in the FIG. 3, a first group of light loads may operate optimally in a first and highest area D just below the maximum value A, a second group of light loads may operate optimally in a second and lower area E below the nominal value B, and a third group of light loads may operate optimally in a third and lowest area F just above the minimum value C. Each area D, E and F has an upper and a lower threshold value. Based on a number of illuminating light loads per group in view of a total number of illuminating light loads, the device 1 can calculate a value of a direct current voltage signal, for which value an overall efficiency is maximal.

Figure 3:
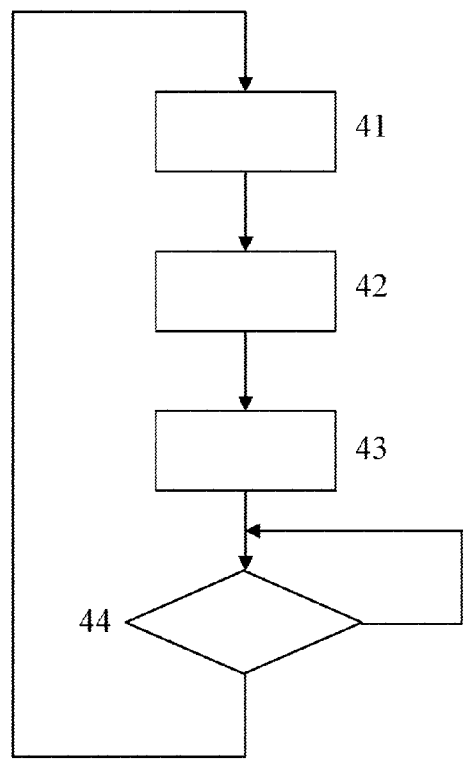
FIG. 3 shows a first flow chart.

In the FIG. 3, a first flow chart is shown, wherein the following blocks have the following meaning:

Block 41: Collect data comprising a definition of an optimal individual voltage signal per illuminating light load 2, 3 and/or a definition of an optimal individual power consumption per illuminating light load 2, 3, if not already available.

Block 42: Re-arrange the data such that the different groups and the different areas are taken into account, for example through a determination of a first group of light loads that operate optimally in the area D and through a determination of a second group of light loads that operate optimally in the area E and through a determination of a third group of light loads that operate optimally in the area F, whereby, for example based on a number of illuminating light loads per group in view of a total number of illuminating light loads, a value X of a direct current voltage signal is calculated, for which value X an overall efficiency is maximal, with C<X<A.

Block 43: Set the direct current voltage signal for the bus 4 to the value X.

Block 44: Guard the total power consumption consumed via the bus 4 for example once per time-interval, in case of no change, go to block 44, in case of a change, go to block 41.

According to this example, information from the light loads 2, 3 is used to facilitate bus voltage modulation. The device 1 sets the direct current voltage signal for the bus 4 depending on this information to yield an improved to best efficiency for the whole lighting environment. Alternatively, a value X may be calculated, with C<X<A, for which value X a total power consumption is minimal.

Figure 4:
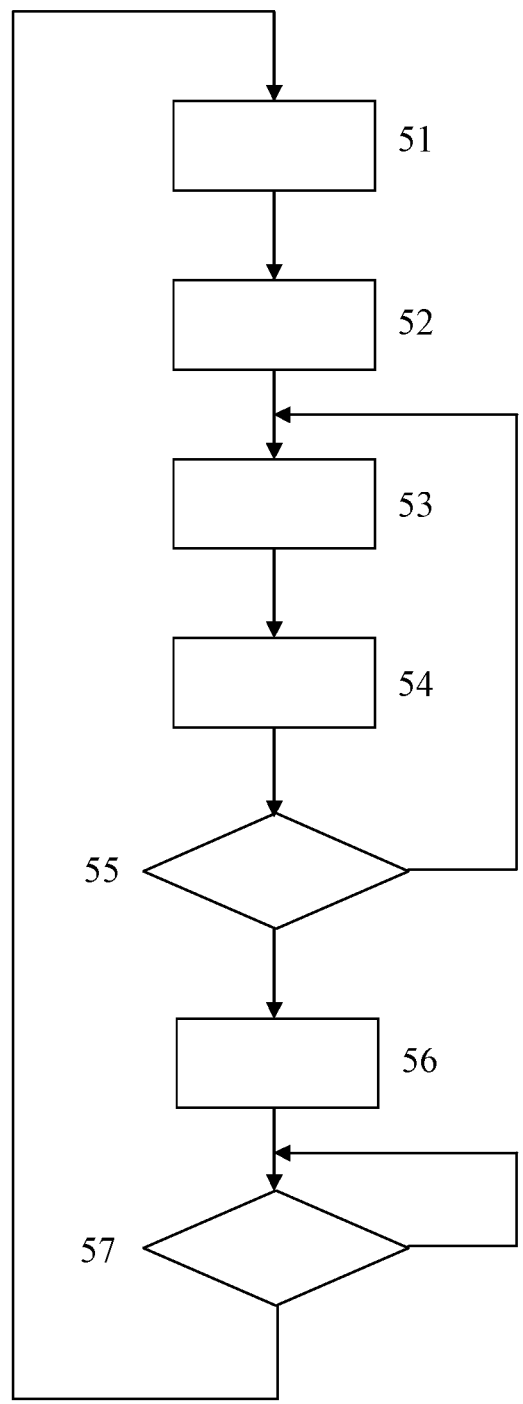
FIG. 4 shows a second flow chart.

In the FIG. 4, a second flow chart is shown, wherein the following blocks have the following meaning: Block 51: Set the direct current voltage signal for the bus 4 to the value C.

Block 52: Measure the total power consumption consumed via the bus 4 for this value C and store the measured value of the power consumption together with the value C.

Block 53: Increase the value of the direct current voltage signal for the bus 4 by a step value.

Block 54: Measure the total power consumption consumed via the bus 4 for this increased value and store the measured value of the power consumption together with the value C.

Block 55: Is the value of the direct current voltage signal for the bus 4 equal to the value A? If yes, go to block 56, if no, go to block 53.

Block 56: Set the direct current voltage signal for the bus 4 to the value for which the total power consumption is minimal.

Block 57: Guard the total power consumption consumed via the bus 4 for example once per time-interval, in case of no change, go to block 57, in case of a change, go to block 51.

According to this example, the device 1 sweeps the direct current voltage signal for the bus 4, for example at regular or irregular time intervals, within the allowed voltage band.

The device 1 searches for a minimum power consumption point (MPCP) and sets the bus voltage.

Figure 5:
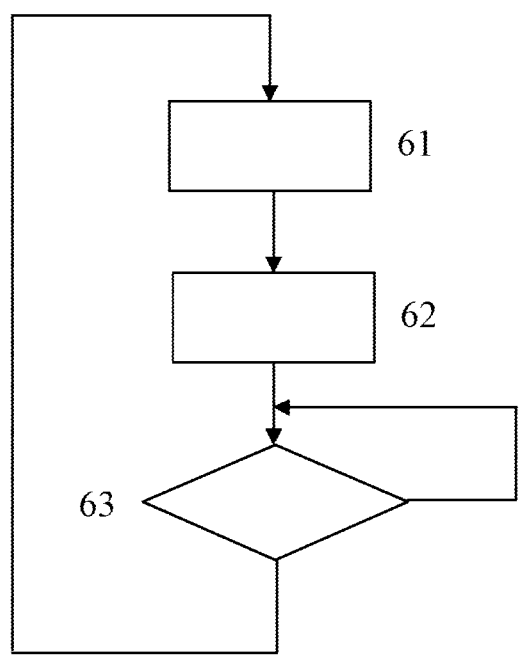
FIG. 5 shows a third flow chart.

In the FIG. 5, a third flow chart is shown, wherein the following blocks have the following meaning:

Block 61: Collect data comprising a definition of a voltage amplitude per illuminating light load 2, 3, if not already available, each light load 2, 3 for example comprising one or more light emitting diodes driven via a regulator, in which case the voltage amplitude is equal to an amplitude necessary for an (optimal) operation of a combination of the one or more light emitting diodes and the regulator. Other kinds of light loads are not to be excluded.

Block 62: Determine a maximum voltage amplitude of all voltage amplitudes collected, and select a value for the direct current voltage signal for the bus 4, which value for the direct current voltage signal for the bus 4 is equal to or slightly larger than the maximum voltage amplitude.

Block 63: Guard the total power consumption consumed via the bus 4 for example once per time-interval, in case of no change, go to block 63, in case of a change, go to block 61.

According to this example, the device 1 searches for the light load 2, 3 that requires a largest feeding voltage signal. When a temperature is changed or light loads 2, 3 are switched on/off, a largest feeding voltage signal of a group of light loads 2, 3 may also change. Based on this, the bus voltage is adapted to power the group of light loads 2, 3 effectively and efficiently.

A definition of an optimal individual voltage signal may define an absolutely optimal individual voltage signal or may define a relatively optimal individual voltage signal. A definition of an optimal individual power consumption may define an absolutely optimal individual power consumption or may define a relatively optimal individual power consumption. A minimal total power consumption may be an absolutely minimal total power consumption or may be a relatively minimal total power consumption. A maximal overall efficiency may be an absolutely maximal overall efficiency or may be a relatively maximal overall efficiency.

Summarizing, devices 1 for selecting settings for illuminating light loads 2, 3 connected to a bus 4 comprise controllers 11 for running processes and for defining, through controls of power converters 5, 6 connected to the bus 4, in response to process results, direct current voltage signals for the bus 4 and comprise power detectors 12 for detecting changes in total power consumptions of the illuminating light loads 2, 3 and for in response to detections of the changes informing the controllers 11 to run the processes again. This way, links are created between the total power consumption via the bus 4 and the direct current voltage signal on the bus 4, to save energy. The devices 1 may further comprise receivers 13 for receiving definitions of optimal individual voltage signals and/or of optimal individual power consumptions and/or of voltage amplitudes and may further comprise power meters 14 for measuring the total power consumption of the illuminating light loads 2, 3 for different direct current voltage signals for the bus 4.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A device for selecting a setting for one or more illuminating light loads connected to a bus, the device comprising
   a controller configured to run a calculation and define, through a control of a power converter connected to the bus, in response to a calculation result, a direct current voltage signal for the bus, wherein in said calculation said controller calculates the value of the direct current voltage signal to be equal to or slightly larger than a maximum voltage amplitude of the one or more illuminating light loads, or calculates the value of the voltage signal for which an overall efficiency of the one or more illuminating light loads is maximal, or for which the total power consumption of the one or more illuminating light loads is minimal; and
   a power detector configured to detect a change in a total power consumption of the one or more illuminating light loads and in response to a detection of the change informing the controller to run the calculation again.

2. The device as defined in claim 1, the power converter comprising an alternating current to direct current converter or comprising a direct current to direct current converter.

3. The device as defined in claim 1, further comprising
   a receiver configured to receive, from the one or more illuminating light loads connected to the bus, a definition of an optimal individual voltage signal per illuminating light load and/or a definition of an optimal individual power consumption per illuminating light load, wherein the calculation comprises a calculation based on the definition per illuminating light load and storing, for different direct current voltage signals for the bus, of the total power consumption or of an overall efficiency of the one or more illuminating light loads per direct current voltage signal for the bus, wherein the calculation comprises a selection of one of the different direct current voltage signals for the bus, for which one direct current voltage signal for the bus the total power consumption of the one or more illuminating light loads is minimal or the overall efficiency of the one or more illuminating light loads is maximal, and wherein the setting comprises the selected direct current voltage signal for the bus.

4. The device as defined in claim 3, the receiver being a wireless receiver configured to receive the definitions from the light loads via a wireless connection.

5. The device as defined in claim 3, the receiver being a wired receiver configured to receive the definitions from the light loads via the bus or another wired connection.

6. The device as defined in claim 1, further comprising
   a power meter configured to measure the total power consumption of the one or more illuminating light loads for different direct current voltage signals for the bus, wherein the calculation comprises storing, for the different direct current voltage signals for the bus, of the total power consumption of the one or more illuminating light loads per direct current voltage signal for the bus, wherein the calculation comprises a selection of one of the different direct current voltage signals for the bus, for which one direct current voltage signal for the bus the total power consumption of the one or more illuminating light loads is minimal, and wherein the setting comprises the one direct current voltage signal for the bus.

7. The device as defined in claim 1, the calculation comprising a measurement and storing, for different direct current voltage signals for the bus, of the total power consumption of the one or more illuminating light loads per direct current voltage signal for the bus, wherein the calculation comprises a selection of one of the different direct current voltage signals for the bus, for which one direct current voltage signal for the bus the total power consumption of the one or more illuminating light loads is minimal, and wherein the setting comprises the one direct current voltage signal for the bus.

8. The device as defined in claim 1, further comprising
a receiver configured to receive, from the one or more illuminating light loads connected to the bus, a definition of a voltage amplitude per illuminating light load, wherein the calculation comprises a determination of a maximum voltage amplitude of all voltage amplitudes received, wherein the calculation comprises a selection of a value of the direct current voltage signal for the bus, which value of the direct current voltage signal for the bus is equal to or slightly larger than the maximum voltage amplitude, and wherein the setting comprises the value of the direct current voltage signal for the bus.

9. The device as defined in claim 1, the calculation comprising a retrieval, per illuminating light load connected to the bus, of a definition of a voltage amplitude of that illuminating light load, wherein the calculation comprises a determination of a maximum voltage amplitude of all voltage amplitudes retrieved, wherein the calculation comprises a selection of a value of the direct current voltage signal for the bus, which value of the direct current voltage signal for the bus is equal to or slightly larger than the maximum voltage amplitude, and wherein the setting comprises the value of the direct current voltage signal for the bus.

10. A system for selecting a setting for one or more illuminating light loads connected to a bus, the system comprising: the
a power converter;
one or more illuminating light loads;
a controller configured to run a calculation and define, through a control of the power converter connected to the bus, in response to a calculation result, a direct current voltage signal for the bus, wherein in said calculation said controller calculates the value of the direct current voltage signal to be equal to or slightly larger than a maximum voltage amplitude of the one or more illuminating light loads, or calculates the value of the voltage signal for which an overall efficiency of the one or more illuminating light loads is maximal, or for which the total power consumption of the one or more illuminating light loads is minimal; and
a power detector configured to detect a change in a total power consumption of the one or more illuminating light loads and for in response to a detection of the change informing the controller to run the calculation again.

11. The system as defined in claim 10 and further comprising the one or more illuminating light loads connectable to a bus, wherein the one or more illuminating light loads comprise a transmitter configured to transmit a definition of an optimal individual voltage signal and/or a definition of an optimal individual power consumption to the system device as claimed in claim 3.

12. A method for selecting a setting for one or more illuminating light loads connected to a bus, the method comprising:
running a calculation and defining, through a control of a power converter connected to the bus, in response to a calculation result, a direct current voltage signal for the bus, wherein said calculation determines the value of the direct current voltage signal to be equal to or slightly larger than a maximum voltage amplitude of the one or more illuminating light loads, or calculates the value of the voltage signal for which an overall efficiency of the one or more illuminating light loads is maximal, or for which the total power consumption of the one or more illuminating light loads is minimal; and
detecting a change in a total power consumption of the one or more illuminating light loads and in response to a detection of the change running the calculation again.

13. A non-transitory computer readable medium storing program code that, when run on a computer, performs the steps of the method as defined in claim 12.

* * * * *